United States Patent
Sugawara et al.

(10) Patent No.: US 10,563,001 B2
(45) Date of Patent: Feb. 18, 2020

(54) ACRYLIC BLOCK COPOLYMER, RESIN COMPOSITION AND SHAPED ARTICLE INCLUDING THE SAME, AND OPTICAL COMPONENT

(71) Applicant: KURARAY CO., LTD., Kurashiki-shi (JP)

(72) Inventors: Toshiaki Sugawara, Tsukuba (JP); Hiroshi Oshima, Tsukuba (JP)

(73) Assignee: KURARAY CO., LTD., Kurashiki-shi (JP)

( * ) Notice: Subject to any disclaimer, the term of this patent is extended or adjusted under 35 U.S.C. 154(b) by 85 days.

(21) Appl. No.: 15/575,656

(22) PCT Filed: May 13, 2016

(86) PCT No.: PCT/JP2016/064346
§ 371 (c)(1),
(2) Date: Nov. 20, 2017

(87) PCT Pub. No.: WO2016/190138
PCT Pub. Date: Dec. 1, 2016

(65) Prior Publication Data
US 2018/0112023 A1    Apr. 26, 2018

(30) Foreign Application Priority Data

May 22, 2015  (JP) ................. 2015-104654
Sep. 3, 2015  (JP) ................. 2015-174145

(51) Int. Cl.
| C08F 297/02 | (2006.01) |
| C08L 53/00 | (2006.01) |
| G02B 1/04 | (2006.01) |
| C08K 5/526 | (2006.01) |
| C08L 33/12 | (2006.01) |
| C08L 33/02 | (2006.01) |

(52) U.S. Cl.
CPC ........ *C08F 297/02* (2013.01); *C08F 297/026* (2013.01); *C08K 5/526* (2013.01); *C08L 33/02* (2013.01); *C08L 33/12* (2013.01); *C08L 53/00* (2013.01); *G02B 1/04* (2013.01); *G02B 1/045* (2013.01)

(58) Field of Classification Search
CPC .... C08F 297/02; C08F 297/026; C08L 33/02; C08L 33/12; C08L 53/00; G02B 1/04; G02B 1/045
See application file for complete search history.

(56) References Cited

U.S. PATENT DOCUMENTS

| 5,264,527 A | 11/1993 | Varshney et al. |
| 5,294,674 A | 3/1994 | Varshney et al. |
| 5,591,816 A | 1/1997 | Varshney et al. |
| 5,668,231 A | 9/1997 | Varshney et al. |
| 6,329,480 B1 | 12/2001 | Uchiumi et al. |
| 2002/0032290 A1 | 3/2002 | Uchiumi et al. |
| 2010/0119797 A1* | 5/2010 | Oshima ................. C08F 297/02 428/220 |
| 2011/0218303 A1 | 9/2011 | Oshima et al. |
| 2013/0217827 A1 | 8/2013 | Ozawa et al. |
| 2015/0299449 A1* | 10/2015 | Ozawa .................. C08L 33/12 362/611 |

FOREIGN PATENT DOCUMENTS

| CN | 101641407 A | 2/2010 |
| CN | 103180382 A | 6/2013 |
| CN | 105764981 A | 7/2016 |
| EP | 3 075 780 A1 | 10/2016 |
| JP | 6-93060 A | 4/1994 |
| JP | 7-25859 B2 | 3/1995 |
| JP | 11-335432 A | 12/1999 |
| JP | 2013-159099 A | 8/2013 |
| TW | 201224045 A1 | 6/2012 |
| TW | 201425437 A | 7/2014 |
| WO | 2010/055798 A1 | 5/2010 |
| WO | 2012/057079 A | 5/2012 |
| WO | 2014/073216 A1 | 5/2014 |

OTHER PUBLICATIONS

JP 2013-159099 machine translation (Year: 2013).*
Extended Search Report dated Nov. 28, 2018 in European Patent Application No. 16799846.7.
International Search Report dated Jul. 12, 2010, in PCT/JP2016/064346, filed May 13, 2016.
Moineau et el., "Synthesis of fully acrylic thermoplastic elastomers by atom transfer radical polymerization (ATRP), $2^{nd}$ Effect of the catalyst on the molecular control and the rheological properties of the triblock copolymers", Macromol. Chem. Phys. vol. 201, 2000, pp. 1108-1114.
Combined Taiwanese Office Action and Search Report dated Jun. 17, 2019 in corresponding Taiwanese Patent Application No. 105115422 (with English Translation of Category of Cited Documents), 15 pages.
Combined Chinese Office Action and Search Report dated Apr. 26, 2019 in corresponding Chinese Patent Application No. 201680028807.3 (with English Translation of Category of Cited Documents), 12 pages.

* cited by examiner

*Primary Examiner* — Edward J Cain
(74) *Attorney, Agent, or Firm* — Oblon, McClelland, Maier & Neustadt, L.L.P.

(57) ABSTRACT

The invention provides an acrylic block copolymer which has excellent transparency, profile extrusion properties and surface smoothness of shaped articles, and which is also excellent in light guiding properties. The acrylic block copolymer includes a polymer block (a1) predominantly containing methacrylic acid ester units and a polymer block (a2) predominantly containing acrylic acid ester units, and has a refractive index of 1.485 to 1.495 and an order-disorder transition temperature (ODTT) of not more than 260° C.

6 Claims, 1 Drawing Sheet

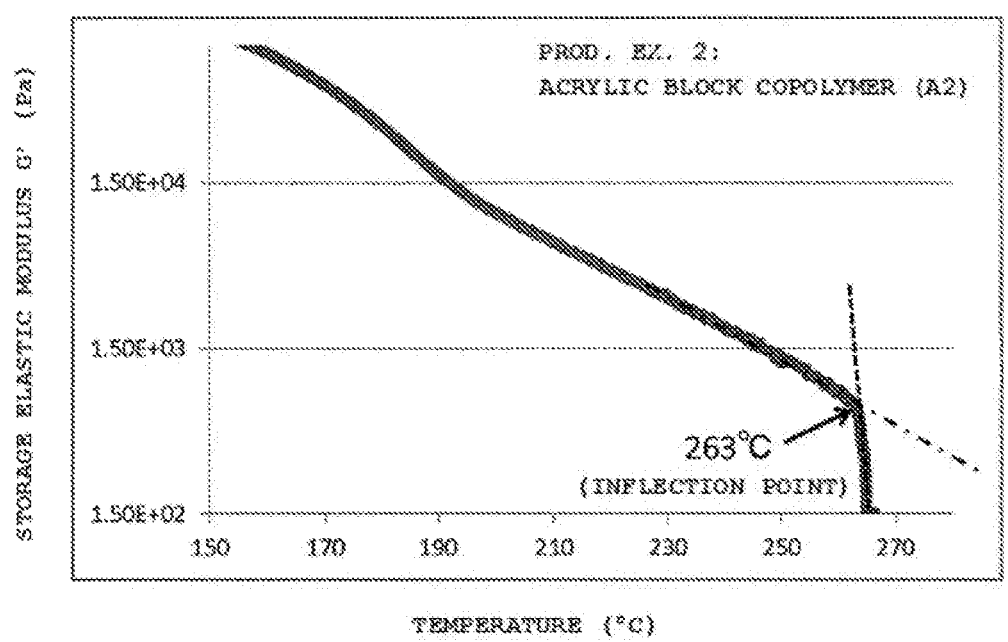

ACRYLIC BLOCK COPOLYMER, RESIN COMPOSITION AND SHAPED ARTICLE INCLUDING THE SAME, AND OPTICAL COMPONENT

TECHNICAL FIELD

The present invention relates to an acrylic block copolymer, to a resin composition and a shaped article including the copolymer, and to an optical component. The present invention provides an acrylic block copolymer which has excellent transparency, profile extrusion properties and surface smoothness of shaped articles, and which is also excellent in light guiding properties.

BACKGROUND ART

Acrylic block copolymers that have a structure formed by bonding of an acrylic acid ester polymer block and a methacrylic acid ester polymer block are conventionally known to be useful in various fields because of their flexibility and outstanding transparency and weather resistance. Such acrylic block copolymers are used in, for example, films and sheets in the optical field, and outdoor construction materials. Unfortunately, the acrylic block copolymers have limited fields of use because of the fact that the physical properties of the copolymer alone are insufficient as compared to styrene-based block copolymers.

Various methods have been proposed as approaches to improving the transparency and shaping workability of acrylic block copolymers. For example, Patent Literature 1 (WO 2010/055798) presents a resin composition obtained by mixing an acrylic block copolymer with a methacrylic resin and having excellent flexibility, transparency and shaping workability. Patent Literature 2 (WO 2012/057079) presents a resin composition obtained by mixing a methacrylic resin with an acrylic block copolymer and having excellent transparency, shaping properties and mechanical properties.

However, these techniques still have room for improvement in transparency and shaping workability, and there has been a demand for acrylic block copolymers that have excellent transparency, profile extrusion properties and surface smoothness of shaped articles and also have outstanding light guiding properties.

CITATION LIST

Patent Literature

Patent Literature 1: WO 2010/055798
Patent Literature 2: WO 2012/057079

SUMMARY OF INVENTION

Technical Problem

Objects of the present invention are to provide an acrylic block copolymer which has excellent transparency, profile extrusion properties and surface smoothness of shaped articles, and which is also excellent in light guiding properties, and to provide a resin composition and a shaped article using the copolymer.

Solution to Problem

The present inventors carried out extensive studies to achieve the above objects. As a result, the present inventors have found that the problems discussed above can be solved by an acrylic block copolymer which has specific polymer blocks and a specific refractive index and has an order-disorder transition temperature (ODTT) limited to a specific range.

The present invention pertains to:

[1]: An acrylic block copolymer that includes a polymer block (a1) predominantly containing methacrylic acid ester units and a polymer block (a2) predominantly containing acrylic acid ester units, and has a refractive index of 1.485 to 1.495 and an order-disorder transition temperature (ODTT) of not more than 260° C.

[2]: The acrylic block copolymer described in [1], wherein the polymer block (a2) predominantly containing acrylic acid ester units is a copolymer block containing 50 to 90 mass % of an acrylic acid alkyl ester and 50 to 10 mass % of an acrylic acid aromatic ester.

[3]: The acrylic block copolymer described in [1] or [2], which has at least one structure in which the polymer block (a1) predominantly containing methacrylic acid ester units is bonded to both ends of the polymer block (a2) predominantly containing acrylic acid ester units.

[4]: The acrylic block copolymer described in any one of [1] to [3], wherein the refractive indexes of the polymer block (a1) predominantly containing methacrylic acid ester units and the polymer block (a2) predominantly containing acrylic acid ester units are each 1.485 to 1.495.

[5]: The acrylic block copolymer described in any one of [1] or [4], which has a weight average molecular weight of 10,000 to 150,000.

[6]: The acrylic block copolymer described in any one of [1] or [5], which has a tensile elastic modulus of 1 to 1500 MPa.

[7]: The acrylic block copolymer described in any one of [1] to [6], wherein the acrylic block copolymer includes an acrylic block copolymer (A1) having a content of the polymer block (a1) of not less than 40 mass % and an acrylic block copolymer (A2) having a content of the polymer block (a1) of less than 40 mass %, and the mass ratio [(A1)/(A2)] of the acrylic block copolymer (A1) to the acrylic block copolymer (A2) is 10/90 to 90/10.

[8]: A resin composition including the acrylic block copolymer described in any one of [1] to [7].

[9]: The resin composition described in [8], which contains the acrylic block copolymer described in any one of [1] to [7] in a proportion of more than 90 mass %.

[10]: The resin composition described in [8] or [9], further including a phosphite-based compound represented by the following formula in a proportion of 0.01 to 1 part by mass relative to 100 parts by mass of the acrylic block copolymer described in any one of [1] to [7].

[Chem. 1]

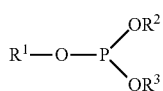

(i)

wherein in the formula (i), $R^1$ is a substituted or unsubstituted aromatic group, $R^2$ and $R^3$ are each independently a hydrogen atom or an organic group, $R^1$ and $R^2$ or $R^3$ may bond to each other to form a ring in combination with the phosphorus atom and the oxygen atom constituting the phosphite, and $R^2$ and $R^3$ may bond to each other to form a ring in combination with the phosphorus atom and the oxygen atom constituting the phosphite.

[11]: The resin composition described in any one of [8] to [10], further including a blue colorant having a maximum absorption wavelength in the range of 590 to 610 nm in a proportion of 0.1 to 4 ppm relative to the acrylic block copolymer described in any one of [1] to [7].

[12]: The resin composition described in any one of [8] to [11], further including a purple colorant having a maximum absorption wavelength in the range of 510 to 530 nm in a proportion of 0.1 to 10 ppm relative to the acrylic block copolymer described in any one of [1] to [7].

[13]: A shaped article including the acrylic block copolymer described in any one of [1] to [7] or the resin composition described in any one of [8] to [12].

[14]: An optical component including the shaped article described in [13].

[15]: A light guide including the optical component described in [14].

Advantageous Effects of Invention

By virtue of the configurations described above, the acrylic block copolymers provided according to the present invention attain excellent transparency, profile extrusion properties and surface smoothness of shaped articles, and also exhibit excellent light guiding properties.

BRIEF DESCRIPTION OF DRAWING

FIG. 1 is a diagram illustrating a relationship between temperature and storage elastic modulus G' in an acrylic block copolymer (A2) obtained in Production Example 2.

DESCRIPTION OF EMBODIMENTS

The present invention will be described in detail hereinbelow.

An acrylic block copolymer (A) of the present invention includes a polymer block (a1) predominantly containing methacrylic acid ester units and a polymer block (a2) predominantly containing acrylic acid ester units, and has a refractive index of 1.485 to 1.495 and an order-disorder transition temperature (ODTT) of not more than 260° C.

In the acrylic block copolymer (A), the polymer block (a1) predominantly containing methacrylic acid ester units is a polymer block that mainly contains methacrylic acid ester units Here, the phrase "predominantly containing" means that structural units derived from a methacrylic acid ester represent 50 mass % or more of the total mass of the polymer block (a1). The proportion of the methacrylic acid ester units in the polymer block (a1) is preferably not less than 60 mass % of the polymer block (a1), and is more preferably not less than 80 mass %, and still more preferably not less than 90 mass %, and may be 100 mass %. Examples of the methacrylic acid esters for forming the polymer blocks (a1) include methyl methacrylate ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate and 2-methoxyethyl methacrylate.

Of these methacrylic acid esters, methacrylic acid alkyl esters such as methyl methacrylate, ethyl methacrylate, isopropyl methacrylate, n-butyl methacrylate, tert-butyl methacrylate, cyclohexyl methacrylate and isobornyl methacrylate are preferable to enhance transparency and heat resistance, and methyl methacrylate is more preferable. The polymer block (a1) may be composed of a single, or two or more kinds of these methacrylic acid esters.

In the acrylic block copolymer (A), the polymer block (a2) predominantly containing acrylic acid ester units is a polymer block that mainly contains acrylic acid ester units. Here, the phrase "predominantly containing" means that structural units derived from an acrylic acid ester represent 50 mass % or more of the total mass of the polymer block (a2). The proportion of the acrylic acid ester units in the polymer block (a2) is preferably not less than 60 mass % of the polymer block (a2), and is more preferably not less than 80 mass %, and still more preferably not less than 90 mass %, and may be 100 mass %. Examples of the acrylic acid esters for forming the polymer blocks (a2) include methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate and 2-methoxyethyl acrylate.

Of these acrylic acid esters, acrylic acid alkyl esters such as methyl acrylate, ethyl acrylate, isopropyl acrylate, n-butyl acrylate, 2-ethylhexyl acrylate, dodecyl acrylate, phenoxyethyl acrylate and 2-methoxyethyl acrylate are preferable to enhance flexibility, and n-butyl acrylate and 2-ethylhexyl acrylate are more preferable. The polymer block (a2) may be composed of a single, or two or more kinds of these acrylic acid esters.

Without causing a hindrance to the objects and advantageous effects of the invention, the polymer block (a2) may contain comonomer components such as acrylic acid ester units having a reactive group, for example, glycidyl acrylate and allyl acrylate; or additional polymerizable monomer units other than acrylic acid ester units, for example, methacrylic acid esters, methacrylic acid, acrylic acid, aromatic vinyl compounds, acrylonitriles, methacrylonitriles and olefins that will be described later. To ensure that the advantageous effects of the invention will be sufficiently obtained, the amount of these acrylic acid ester units having a reactive group or additional polymerizable monomer units is preferably small, and is preferably not more than 10 mass %, and more preferably not more than 2 mass %.

To control the refractive index of the acrylic block copolymer (A) to fall in the preferred range, it is preferable that, the polymer block (a2) predominantly containing acrylic acid ester units is a copolymer block of the above acrylic acid alkyl ester with an acrylic acid aromatic ester. To enhance transparency and light guiding properties, the acrylic acid aromatic ester that is copolymerized with the acrylic acid alkyl ester is preferably, among others, benzyl acrylate, phenyl acrylate, phenoxyethyl acrylate, phenoxydiethylene glycol acrylate, phenoxy-polyethylene glycol acrylate or 2-hydroxy-3-phenoxypropyl acrylate, and is more preferably benzyl acrylate.

To control the refractive index to fall in the preferred range and to control the order-disorder transition temperature (ODTT) to not more than 260° C., the polymer block (a2) predominantly containing acrylic acid ester units is preferably a copolymer block containing 50 to 90 mass % of an acrylic acid alkyl ester and 50 to 10 mass % of an acrylic acid aromatic ester, and is more preferably a copolymer block containing 60 to 80 mass % of an acrylic acid alkyl ester and 40 to 20 mass % of an acrylic acid aromatic ester.

The refractive index of the acrylic block copolymer (A) is 1.485 to 1.495. The refractive index in this range ensures that the transparency of a resin composition that is obtained will be enhanced and the light guiding properties of a shaped article that is obtained will be enhanced.

While the form of the molecular chain of the acrylic block copolymer (A) is not particularly limited and may be any of, for example, linear, branched and radial, it is preferable that the molecule of the copolymer have at least one (a1)-(a2)-(a1) structure composed of two polymer blocks (a1) predominantly containing methacrylic acid ester units and one polymer block (a2) predominantly containing acrylic acid ester units. In particular, it is more preferable to use a triblock copolymer represented by (a1)-(a2)-(a1). Here, the configurations such as molecular weight and composition of the polymer blocks (a1) at both ends of (a2) may be the same as or different from each other. Another preferred form of the molecular chain of the acrylic block copolymer (A) is a diblock copolymer represented by (a1)-(a2).

The refractive index of the polymer block (a1) predominantly containing methacrylic acid ester units and that of the polymer block (a2) predominantly containing acrylic acid ester units are each preferably in the range of 1.485 to 1.495.

The weight average molecular weight of the acrylic block copolymer (A) is preferably 10,000 to 150,000 to control the order-disorder transition temperature (CDTT) to not more than 260° C., and is preferably 30,000 to 120,000, and more preferably 50,000 to 100,000 to ensure that a resin composition, a shaped article and an optical component of the present invention will attain enhancements in properties such as flexibility and shaping workability. When the weight average molecular weight of the acrylic block copolymer (A) is 10,000 or more, a sufficient melt tension can be ensured during melt extrusion and a satisfactory shaped article can be obtained. Further, the shaped article obtained attains excellent mechanical properties such as break strength. When the molecular weight is 150,000 or less, a quality shaped article tends to be obtained by melt extrusion with little occurrence of fine grained irregularities on the surface or granular structures ascribed to unmolten components (high-molecular components) on the surface of the shaped article.

To control the order-disorder transition temperature (ODTT) to not more than 260° C., the ratio (Mw/Mn) of the weight average molecular weight (Mw) to the number average molecular weight (Mn) of the acrylic block copolymer (A) is preferably in the range of 1.01 to 1.50, and more preferably in the range of 1.01 to 1.35. By adopting this range, the content of unmolten components that form granular structures in a shaped article of a resin composition of the invention can be reduced to an extremely low level.

The tensile elastic modulus of the acrylic block copolymer (A) of the invention is preferably 1 to 1500 MPa, and more preferably 10 to 1000 MPa. When the tensile elastic modulus falls in this range, characteristics with an excellent balance between mechanical strength and flexibility can be obtained.

The order-disorder transition temperature (ODTT) of the acrylic block copolymer (A) of the invention is not more than 260° C. By virtue of the ODTT being not more than 260° C., workability is enhanced, good profile extrusion properties are obtained, and a shaped article that is obtained attains excellent surface smoothness. Further, the shaping temperature is decreased, making it possible to prevent a lowering in transparency due to thermal coloration during the shaping process. The ODTT is more preferably not more than 250° C., and still more preferably not more than 230° C. Although the lower limit is not particularly limited, the ODTT is, for example, 100° C. or above.

The order-disorder transition temperature (ODTT) of the acrylic block copolymer (A) may be controlled to a desired value, for example, by controlling the weight average molecular weight or molecular weight distribution (Mw/Mn) of the acrylic block copolymer (A) or by controlling the proportions of the constituents of the polymer block (a2) that predominantly contains acrylic acid ester units. The ODTT is increased as the weight average molecular weight or molecular weight distribution of the acrylic block copolymer (A) is increased, and the ODTT is increased with increasing proportion of an acrylic acid alkyl ester in the polymer block (a2) that predominantly contains acrylic acid ester units. The ODTT may be measured by the method described in Examples.

The acrylic block copolymer (A) may be produced by any method that is deemed as known without limitation. For example, living polymerization of monomers that will form the respective blocks is generally used. Examples of such living polymerization techniques include a method where anionic polymerization is performed using an organic alkali metal compound as a polymerization initiator in the presence of a mineral acid salt such as a salt of an alkali metal or an alkaline earth metal (see JP-B-H07-25859), a method where anionic polymerization is performed in the presence of an organoaluminum compound while using an organic alkali metal compound as a polymerization initiator (see JP-A-H11-335432), a method where polymerization is performed using an organic rare earth metal complex as a polymerization initiator (see JP-A-H06-93060), and a method where radical polymerization is performed using an α-halogenated ester compound as an initiator in the presence of a copper compound (see Macromol. Chem. Phys., Vol. 201, pp. 1108-1114 (2000)). Examples further include a method where monomers that will form the respective blocks are polymerized using a polyvalent radical polymerization initiator or a polyvalent radical chain transfer agent so as to produce a mixture containing the acrylic block copolymer (A) of the present invention. Of these methods, in particular, anionic polymerization performed in the presence of an organoaluminum compound while using an organic alkali metal compound as a polymerization initiator, is recommended for the reasons that the acrylic block copolymer can be obtained with high purity, the control of the molecular weight and the compositional ratio is easy, and the method is economically efficient.

The acrylic acid ester that is used for the production of the polymer block (a2) predominantly containing acrylic acid ester units may be a mixture of two or more kinds of monomers that are mixed beforehand. To control the refractive index to fail in the preferred range and to control the order-disorder transition temperature (ODTT) to not more than 260° C., it is preferable to use a monomer mixture including an acrylic acid alkyl ester and an acrylic acid aromatic ester. In this case, the monomer mixture preferably includes 50 to 90 mass % of an acrylic acid alkyl ester and 50 to 10 mass % of an acrylic acid aromatic ester, and more preferably includes 60 to 80 mass % of an acrylic acid alkyl ester and 40 to 20 mass % of an acrylic acid aromatic ester.

A resin composition of the present invention includes the acrylic block copolymer (A), and preferably contains the acrylic block copolymer (A) in a proportion of more than 90 mass %, more preferably in a proportion of 91 mass % to 99 mass %, and still more preferably in a proportion of 92 mass % to 98 mass %. This proportion of the acrylic block copolymer (A) ensures that the resin composition that is obtained attains excellent transparency, profile extrusion properties and surface smoothness of shaped articles and also achieves excellent light guiding properties.

The acrylic block copolymers (A) may be used singly, or two or more may be used as a mixture. To satisfy flexibility and profile extrusion properties, it is preferable that, when two or more kinds of the copolymers are used as a mixture, the acrylic block copolymer (A) include an acrylic block copolymer (A1) having a content of the polymer block (a1) of not less than 40 mass % and an acrylic block copolymer (A2) having a content of the polymer block (a1) of less than 40 mass %, and the mass ratio [(A1)/(A2)] of the acrylic block copolymer (A1) to the acrylic block copolymer (A2) is 10/90 to 90/10, and more preferably 20/80 to 80/20.

The resin composition of the invention may contain an additional polymer other than the acrylic block copolymer (A). Examples of such additional polymers include methacrylic resins, olefin-based resins such as polyethylene, polypropylene, polybutene-1, poly-4-methylpentene-1 and polynorbornene; ethylene-based ionomers; styrene-based resins such as polystyrene, styrene-maleic anhydride copolymer, high-impact polystyrene, AS resins, ABS resins, AES resins, AAS resins, ACS resins and MBS resins; methyl methacrylate-styrene copolymer; polyester resins such as polyethylene terephthalate, polybutylene terephthalate and polylactic acid; polyamide resins such as nylon 6, nylon 66 and polyamide elastomers; polyurethane resins such as ester-based polyurethane elastomers, ether-based polyurethane elastomers, non-yellowing ester-based polyurethane elastomers and non-yellowing carbonate-based polyurethane elastomers; polycarbonates, polyvinyl chlorides, polyvinylidene chlorides, polyvinyl alcohols, ethylene-vinyl alcohol copolymers, polyacetals, polyvinylidene fluorides, modified polyphenylene ethers, polyphenylene sulfides, silicone rubber-modified resins and phenoxy resins. Of these, a methacrylic resin is preferably used from the point of view of the compatibility with the acrylic block copolymer (A) present in the resin composition of the invention. The content of the additional polymer is preferably not more than 10 mass % of the resin composition.

The methacrylic resin is preferably a methacrylic acid ester homopolymer or a copolymer based on methacrylic acid ester units. Examples of the methacrylic acid esters that are the principal components for constituting the methacrylic resins include methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate and 2-methoxyethyl methacrylate. Of these, methacrylic acid alkyl esters such as methyl methacrylate, ethyl methacrylate, isopropyl methacrylate, n-butyl methacrylate, tert-butyl methacrylate, cyclohexyl methacrylate and isobornyl methacrylate are preferable from the points of view of the compatibility with the acrylic block copolymer present in the resin composition of the invention, and the transparency and shaping workability of the resin composition, and methyl methacrylate is more preferable. The methacrylic acid esters may be used singly, or two or more may be used in combination.

Without causing a hindrance to the objects and advantageous effects of the invention, the methacrylic resin may contain methacrylic acid ester units derived from a methacrylic acid ester having a reactive group, for example, a monomer such as glycidyl methacrylate or allyl methacrylate, in a small amount, preferably in an amount of not more than 20 mass %, and more preferably not more than 10 mass %.

When the methacrylic resin is a copolymer based on methacrylic acid ester units, other monomers to be copolymerized with the methacrylic acid ester constituting the copolymer are not particularly limited. Examples thereof include acrylic acid esters such as methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate and allyl acrylate; unsaturated carboxylic acids such as methacrylic acid, acrylic acid and maleic anhydride; olefins such as ethylene, propylene, 1-butene, isobutylene and 1-octene; conjugated diene compounds such as 1,3-butadiene, isoprene and myrcene; aromatic vinyl compounds such as styrene, α-methylstyrene, p-methylstyrene and m-methylstyrene; vinyl acetate, vinylpyridine, acrylonitrile, methacrylonitrile, vinyl ketone, vinyl chloride, vinylidene chloride, vinylidene fluoride, acrylamide and methacrylamide, with acrylic acid esters being preferable and methyl acrylate being more preferable. These monomers may be used singly, or two or more may be used in combination. Regarding the methacrylic resin, the phrase "based on methacrylic acid ester units" means that the content of the methacrylic acid ester units is not less than 80 mass %.

When the methacrylic resin is a copolymer, the form of copolymerization is not particularly limited. Random copolymerization, block copolymerization, alternating copolymerization or the like is generally used.

The stereoregularity of the methacrylic resin is not particularly limited, and isotactic, heterotactic or syndiotactic resins may be used.

The weight average molecular weight of the methacrylic resin is not particularly limited, but is usually preferably 30,000 to 500,000, and more preferably 70,000 to 200,000. The methacrylic resin used in the invention may be a single methacrylic resin or a mixture of two or more kinds of methacrylic resins having different properties such as weight average molecular weight.

The methacrylic resins which may be used in the invention may be commercial products. Examples of such commercial methacrylic resins include "PARAPET GF", "PARAPET H1000B", "PARAPET EH" and "PARAPET HRL" (trade names, manufactured by KURARAY CO., LTD.).

While still achieving the advantageous effects of the invention, the resin composition may contain various known additives (such as, for example, rubbers, lubricants, antioxidants, UV absorbers, light stabilizers, colorants, dyes, antistatic agents, flame retardants and light diffusing agents), and fillers (such as, for example, fiber reinforcing agents such as glass fibers, and inorganic fillers). Specific examples of the rubbers which may be added include acrylic rubbers; silicone-based rubbers; styrene-based thermoplastic elastomers such as SEPS, SEBS and SIS; and olefin-based rubbers such as IR, EPR and EPDM. One or more of these rubbers may be used. Examples of other additives and fillers which may be added include mineral oil softeners for enhancing fluidity during the shaping process, such as paraffinic oils and naphthenic oils; inorganic fillers for enhancing, for example, heat resistance and weather resistance, as well as for other purposes such as increasing the bulk, such as calcium carbonate, talc, carbon black, titanium oxide, silica, clay, barium sulfate and magnesium carbonate; inorganic fibers or organic fibers for reinforcement, such as glass fibers and carbon fibers; thermal stabilizers; antioxidants; UV absorbers; light stabilizers; pressure-sensitive adhesives; tackifiers; plasticizers; antistatic agents; blowing agents; colorants; dyes; and light diffusing agents. Of these additives, it is practically preferable to add, among others, antioxidants, thermal stabilizers, UV absorbers, light stabilizers, colorants and dyes to further enhance transparency, light guiding properties, heat resistance, weather resistance and light resistance.

Examples of the antioxidants which may be used in the invention include phosphite-based compounds, phenol-based compounds and sulfur-based compounds. Of these, it is preferable to use phosphite-based compounds or phenol-based compounds to enhance transparency, light guiding properties, chromaticity and lightness. It is particularly preferable that a phosphite-based compound be used alone as the antioxidant.

The resin composition of the invention preferably includes a phosphite-based compound (i) represented by the following formula (i) in a proportion of 0.01 to 1 part by mass, or more preferably in a proportion of 0.02 to 0.5 parts by mass relative to 100 parts by mass of the acrylic block copolymer (A).

[Chem. 2]

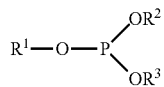

(i)

In the formula (i), $R^1$ is a substituted or unsubstituted aromatic group, $R^2$ and $R^3$ are each independently a hydrogen atom or an organic group, $R^1$ and $R^2$ or $R^3$ may bond to each other to form a ring in combination with the phosphorus atom and the oxygen atom constituting the phosphite, and $R^2$ and $R^3$ may bond to each other to form a ring in combination with the phosphorus atom and the oxygen atom constituting the phosphite.

Examples of the substituted or unsubstituted aromatic groups represented by $R^1$ in the formula (i) include phenyl group, substituted phenyl groups, phenylene group and substituted phenylene groups. In the formula (i), $R^2$ and $R^3$ are each independently a hydrogen atom or an organic group. The organic group represented by $R^2$ and/or $R^3$ may be any organic group which does not impair the function of the phosphite-based compound (i). Examples of such organic groups include alkyl groups, substituted alkyl groups, phenyl group, substituted phenyl groups, and alkylene groups. In the phosphite-based compound (i), $R^1$ and $R^2$ may bond to each other to form a ring in combination with the phosphorus atom and the oxygen atom constituting the phosphite, $R^1$ and $R^3$ may bond to each other to form a ring in combination with the phosphorus atom and the oxygen atom constituting the phosphite, or $R^2$ and $R^3$ may bond to each other to form a ring in combination with the phosphorus atom and the oxygen atom constituting the phosphite.

Specific examples of the phosphite-based compounds (i) include triphenyl phosphite, tris(2,4-di-tert-butylphenyl) phosphite, tris(2,5-di-tert-butylphenyl) phosphite, tris(nonylphenyl) phosphite, tris(dinonylphenyl) phosphite, tris (mono- and di-nonylphenyls) phosphite, bis(2-tert-butyl-4,6-dimethylphenyl) ethyl phosphite, diphenyl acid phosphite, diphenyl decyl phosphite, phenyl diisodecyl phosphite, 2,2'-methylenebis(4,6-di-tert-butylphenyl) octyl phosphite, 2,2'-methylenebis(4,6-di-tert-butylphenyl) octadecyl phosphite, 2,2'-methylenebis(4,6-di-tert-butylphenyl) octyl phosphite, 2,2'-ethylidenebis(4,6-di-tert-butylphenyl) fluorophosphite, bis(2,4-di-tert-butylphenyl) pentaerythritol diphosphite, bis(2,5-di-tert-butylphenyl) pentaerythritol diphosphite, bis(2,6-di-tert-butyl-4-methylphenyl) pentaerythritol diphosphite, bis(2,4,6-tri-tert-butylphenyl) pentaerythritol diphosphite, bis(2,4-dicumylphenyl) pentaerythritol diphosphite, phenyl-4,4'-isopropylidenediphenol pentaerythritol diphosphite, tetra(C12-15 alkyls) bisphenol A diphosphite, tetrakis(2,4-di-tert-butylphenyl) biphenylene diphosphonite, tetratridecyl-4,4'-butylidene bis(2-tert-butyl-5-methylphenol) diphosphite, bis[2,2'-methylenebis(4,6-diamylphenyl)] isopropylidene diphenyl phosphite, hydrogenated-4,4'-isopropylidenediphenol polyphosphite, bis(octylphenyl) bis [4,4'-n-butylidenebis(2-tert-butyl-5-methylphenol)]1,6-hexanediol diphosphite, hexa(tridecyl) 1,1,3-tris(2-methyl-5-tert-butyl-4-hydroxyphenyl)butane triphosphonite, 2-butyl-2-ethylpropanediol 2,4,6-tri-tert-butylphenol monophosphite, and tris(2-[(2,4,8,10-tetrakis tert-butyldibenzo[d, f][1,3,2]dioxaphosphepin-6-yl)oxy]ethyl)amine. These phosphite-based compounds (i) may be used singly, or two or more may be used in combination.

The phosphite-based compounds (i) which may be used in the invention may be commercial products. Examples of such commercial phosphite-based compounds (i) include "ADK STAB PEP-36", "ADK STAB PEP-36A" and "ADK STAB 2112" (trade names, manufactured by ADEKA CORPORATION).

To reduce a change in chromaticity when light is passed through a shaped article, the resin composition of the invention preferably includes a blue colorant having a maximum absorption wavelength in the range of 590 to 610 nm in a proportion of 0.1 to 4 ppm, or more preferably in a proportion of 0.3 to 4 ppm relative to the content of the acrylic block copolymer (A). For the same purpose as above, the resin composition preferably includes a purple colorant having a maximum absorption wavelength in the range of 510 to 530 nm in a proportion of 0.1 to 10 ppm, or more preferably in a proportion of 0.3 to 7 ppm relative to the content of the acrylic block copolymer (A). To attain a further reduction in chromaticity change, the blue colorant and the purple colorant are preferably used in combination. Specifically, it is more preferable that the contents of the colorants be 0.3 to 2 ppm and 0.5 to 7 ppm, respectively. From the point of view of the reduction in chromaticity change, it is still more preferable that the blue colorant and/or the purple colorant be used together with the phosphite-based compound (i). The maximum absorption wavelengths may be calculated by analyzing a sample formed from the resin composition containing the colorants with a UV-visible spectrophotometer so as to measure the spectral transmittances.

Examples of the colorants which may be used in the invention include inorganic pigments, organic pigments and dyes, although not particularly limited thereto.

The colorants which may be used in the invention may be commercial products. Examples of such commercial colorants include blue pigment "BPA-5500A" and purple pigment "TV-4M" (trade names, manufactured by Nippon Pigment Company Limited). The maximum absorption wavelengths of the colorants determined by the above calculation method are 600 nm for blue pigment "BPA-5500A" and 520 nm for purple pigment "TV-4M".

The tensile elastic modulus of the acrylic block copolymer and the resin composition of the invention is preferably 1 to 1500 MPa, and more preferably 10 to 1000 MPa. When the tensile elastic modulus falls in this range, characteristics with an excellent balance between mechanical strength and flexibility can be obtained.

The resin composition of the invention may be prepared by any method without limitation. A method where the components that will constitute the resin composition are mixed together by melt-kneading is recommended in order to highly disperse the components. In an exemplary preparation method, the acrylic block copolymer (A) and other components such as a methacrylic resin are melt-kneaded; where necessary, additional polymers and additives described hereinabove may be mixed therewith at the same time, or the acrylic block copolymer (A) may be first mixed with such additional polymers and additives and thereafter mixed with other components such as a methacrylic resin. For example, the mixing operation may be performed using a known mixing or kneading device such as a kneader-ruder, an extruder, a mixing roll or a Banbury mixer. In particular, to enhance the kneadability and compatibility between the acrylic block copolymer (A) and other components such as a methacrylic resin, a twin-screw extruder is preferably used. The temperature during mixing and kneading may be controlled appropriately in accordance with factors such as the melting points of the components such as the acrylic block copolymer (A) and a methacrylic resin that are used. It is usually recommended that mixing takes place at a temperature in the range of 110 to 300° C. By the method described above, the resin composition of the invention may be obtained in the desired form such as pellets or a powder. The resin composition in such a form as pellets or a powder is suitably handled as a shaping material.

The acrylic block copolymer and the resin composition of the present invention may be shaped into articles using a shaping method and a shaping device which are generally used for thermoplastic polymers, and shaped articles including the acrylic block copolymer or the resin composition of the invention may be thus obtained. For example, such shaped articles may be produced by a solution casting method or a shaping method involving thermal fusion such as extrusion, injection molding, compression molding, blow molding, calendering or vacuum forming. In particular, the acrylic block copolymer and the resin composition of the invention are suited for extrusion because of their outstanding profile extrusion properties and melt fluidity, and can give extrudates having excellent surface smoothness.

By the shaping methods described above, articles having desired shapes may be obtained such as fibers, molded articles, pipes, sheets, films, fibrous products and laminated body. Further, shaped articles having a core-clad structure may be also obtained.

The acrylic block copolymer and the resin composition of the invention, and shaped articles made therefrom may be used in any applications without limitation and can find use in various applications such as optical field, food field, medical field, consumer goods field, automobile field, and electric/electronic field. In particular, the shaped articles obtained in the present invention may be suitably used for optical components because of their excellent transparency, profile extrusion properties, surface smoothness and light guiding properties. Examples of such optical components include light guides such as light guides having a core-clad structure, various covers, various terminal plates, printed circuit boards, speakers, microscopes, binoculars, cameras, watches or clocks; video-, optical recording-, optical communication- and information equipment-related parts such as finders, filters, prisms, Fresnel lenses, various optical disc (such as VD, CD, DVD, MD and LD) substrate protective films, optical switches, optical connectors and liquid crystal displays in cameras, VTRs, projection TVs and the like; liquid crystal display light guide films and sheets, flat panel displays, flat panel display light guide films and sheets, plasma displays, plasma display light guide films and sheets, retardation films and sheets, polarizing films and sheets, polarizer protective films and sheets, waveplates, light diffusing films and sheets, prism films and sheets, reflective films and sheets, antireflective films and sheets, viewing angle enlarging films and sheets, antiglare films and sheets, luminance improving films and sheets, liquid crystal or electroluminescence display element substrates, touch panels, touch panel light, guide films and sheets, and spacers between various front plates and various modules. Further, their excellent properties such as weather resistance and flexibility offer suitable use in known construction materials such as, for example, interior and exterior members for construction, curtain walls, roofing members, roofing materials, window members, gutters, exteriors, wall materials, flooring materials, fixture materials, road construction members, retroreflective films and sheets, agricultural films and sheets, lighting covers, signs and translucent sound insulation walls.

EXAMPLES

The present invention will be described in detail based on examples hereinbelow, but it should be construed that the present invention is in no way limited to those examples.

The measurement apparatuses and measurement methods used in Examples and Comparative Examples are described below.

(1) Weight Average Molecular Weight (Mw) and Molecular Weight Distribution (Mw/Mn)

The weight average molecular weight (Mw) of an acrylic block copolymer (A) was determined relative to standard polystyrenes by gel permeation chromatography (hereinafter, abbreviated as GPC).

Apparatus; GPC apparatus "HLC-8020" manufactured by TOSOH CORPORATION

Separation columns: "TSKgel GMHXL", "G4000HXL" and "G5000HXL" manufactured by TOSOH CORPORATION were connected in series.

Eluent: tetrahydrofuran

Flow rate of eluent: 1.0 ml/min

Column temperature: 40° C.

Detection method: differential refractive index (RI)

(2) Proportions of Polymer Blocks

The proportions of polymer blocks in an acrylic block copolymer (A), and the compositional ratios of the respective polymer blocks were determined by $^1$H-NMR (1H-nuclear magnetic resonance) measurement.

Apparatus: nuclear magnetic resonance apparatus "JNM-LA400" manufactured by JEOL Ltd.

Deuterated solvent: deuterated chloroform (3) Refractive Index

An acrylic block copolymer (A) was melted at 230° C. and was molded into an article 32 mm in length, 6 mm in width and 3 mm in thickness using an ultra-small injection molding machine (Mini Max Holder manufactured by Custom Scientific Instruments, Inc.). A sample (an 8 mm×8 mm×12 mm right triangle having a thickness of 3 mm) was cut out from the shaped article, and was tested by a V block method at a measurement temperature of 25° C. using the following apparatus and conditions to measure the refractive index.

Apparatus: "Refractometer PR-2" manufactured by Carl Zeiss Jena

Measurement wavelength: 587.562 nm (d line)

The refractive index of the acrylic block copolymer (A) and that of the polymer block (a1) were determined by the above method, and the refractive index of the polymer block (a2) was determined from the calculation formula described below using the refractive indexes of the acrylic block copolymer (A) and the polymer block (a1).

Refractive index of polymer block (a2)={Refractive index of acrylic block copolymer (A)−(Refractive index of polymer block (a1)×Volume fraction of polymer block (a1))}÷Volume fraction of polymer block (a2)  Calculation formula:

The volume fractions are values determined using the following calculation formulas.

Calculation Formulas:

[Math. 1]

$$\text{Volume fraction of polymer block } (a1) = \frac{\dfrac{\text{Proportion [mass \%] of polymer block } (a1)}{\text{Specific gravity of polymer block } (a1)}}{\dfrac{\text{Proportion [mass \%] of polymer block } (a1)}{\text{Specific gravity of polymer block } (a1)} + \dfrac{\text{Proportion [mass \%] of polymer block } (a2)}{\text{Specific gravity of polymer block } (a2)}}$$

$$\text{Volume fraction of polymer block } (a2) = \frac{\dfrac{\text{Proportion [mass \%] of polymer block } (a2)}{\text{Specific gravity of polymer block } (a2)}}{\dfrac{\text{Proportion [mass \%] of polymer block } (a1)}{\text{Specific gravity of polymer block } (a1)} + \dfrac{\text{Proportion [mass \%] of polymer block } (a2)}{\text{Specific gravity of polymer block } (a2)}}$$

(4) Flexibility (Tensile Elastic Modulus)

An acrylic block copolymer (A) was molded into a dumbbell-shaped (ISO B type) article using an injection molding machine ("UH1000-80" manufactured by NISSEI PLASTIC INDUSTRIAL CO., LTD.) at a cylinder temperature and a mold temperature described below, and the shaped article was tested in accordance with ISO 527-2 to determine the tensile elastic modulus.

Cylinder temperature: 220° C. (Production Example 1), 230° C. (Production Example 2)

Mold temperature 50° C. (Production Examples 1 and 2)

(5) Order-Disorder Transition Temperature (ODTT)

An acrylic block copolymer (A) was press molded at 230° C. to give a sheet-shaped article having a thickness of 1 mm. The shaped article was stamped into a disc having a diameter of 25 mm, which was then tested by a method in accordance with JIS K7244-10 using an apparatus and conditions described below to determine the storage elastic modulus G' at a temperature range of 100 to 280° C.

From the data thus obtained, a chart (α) was prepared in which the ordinate was the logarithmic scale of storage elastic modulus G' (Pa) and the abscissa was temperature (° C.).

According to general knowledge, the temperature at which G' decreases sharply in the chart (α) is the order-disorder transition temperature (ODTT).

Specifically, the inflection point in the chart (α) was determined in accordance with JIS B0103-5113, and the corresponding temperature was obtained as the order-disorder transition temperature (ODTT) (see FIG. 1).

Apparatus: "ARES Viscoelasticity Measurement System" manufactured by Rheometric Scientific Inc.

Measurement mode; parallel flat plates

Vibration frequency: 6.28 rad/sec

Strain applied: 0.5%

Heat-up rate: 3° C./min (6) Transparency

A resin composition containing an acrylic block copolymer (A) which was obtained in any of Examples and Comparative Examples described later was molded into a sheet-shaped article 5 cm in length, 5 cm in width and 3 mm in thickness using an injection molding machine ("SE18DU" manufactured by Sumitomo Heavy Industries, Ltd.) at a cylinder temperature and a mold temperature described below. With a direct reading haze meter (manufactured by NIPPON DENSHOKU INDUSTRIES CO., LTD.), the haze was measured in accordance with ISO 14782 and the total luminous transmittance was measured in accordance with ISO 13468-1.

Cylinder temperature: 220° C. (Examples 1 to 4), 230° C. (Examples 5 and 6, and Comparative Examples 1 to 3), 240° C. (Example 7)

Mold temperature: 50° C. (Examples 1 to 4, and Comparative Example 1), 60° C. (Examples 5 to 7, and Comparative Examples 2 and 3)

(7) Profile Extrusion Properties

A resin composition containing an acrylic block copolymer (A) which was obtained in any of Examples and Comparative Examples described later was extruded using an apparatus described below which had two-hole dies having diameters of 0.5 mm and 2.0 mm under conditions where the cylinder temperature and the dice temperature were both 180° C. The weights of the resin discharged from the respective dies in 60 seconds were measured, and the discharge rate ratio was determined using the following calculation formula. The smaller the discharge rate ratio, the more uniformly the composition is discharged and the higher the shape stability even when the shape is nonuniform in thickness. The ratio was used as an indicator of profile extrusion properties.

Apparatus: "Capirograph C1" manufactured by Toyo Seiki Seisaku-sho, Ltd.

Piston speed: 20 mm/sec

Discharge rate ratio=(Discharge rate at die with 2.0 mm diameter)÷(Discharge rate at die with 0.5 mm diameter)  Calculation formula:

(8) Surface Smoothness

A resin composition containing an acrylic block copolymer (A) which was obtained in any of Examples and Comparative Examples described later was extruded using a die having an L-shaped orifice (5 mm in maximum vertical length of the L shape×5 mm in maximum transverse length of the L shape) under conditions where the cylinder temperature and the dice temperature were both 220° C. The resultant shaped article in the form of an L-shaped bar was observed with an optical microscope to evaluate the surface state of the flat faces corresponding to the inward bent side of the L shape, thereby obtaining an indicator of surface smoothness.

◯: The surface was smooth and was free from streaky or grained irregularities.

Δ: The surface was substantially smooth but locally had streaky or grained irregularities.

×: The surface had streaky and grained irregularities and was not smooth.

Apparatus: "Capirograph C1" manufactured by Toyo Seiki Seisaku-sho, Ltd.

Piston speed: 100 mm/sec (9) Heat Resistance

A resin composition containing an acrylic block copolymer (A) which was obtained in any of Examples described later was molded into a prismatic article 10 cm in length, 1 cm in width and 4 mm in thickness using an injection molding machine ("SE18DU" manufactured by Sumitomo Heavy Industries, Ltd.) at a cylinder temperature and a mold temperature described below. The shaped article was annealed at 75° C. for 16 hours and was tested in accordance with ISO 75-1 to determine the deflection temperature under load.

Cylinder temperature: 220° C. (Examples 1 and 4), 230° C. (Examples 5 and 6), 240° C. (Example 7)

Mold temperature: 50° C. (Examples 1 and 4), 60° C. (Examples 5 to 7)

Measurement apparatus: "HDT VSPT TESTER S-3M" manufactured by Toyo Seiki Seisaku-sho, Ltd.

Measurement method: flatwise (ISO)

Flexural stress: 0.45 MPa

Maximum deflection amount: 0.34 mm

Start temperature: 40° C.

Heat-up rate: 120° C./h

(10) Light Guiding Properties

An acrylic block copolymer (A) obtained in any of Examples and Comparative Examples described later was extruded at a temperature described below to give a round bar-shaped article having a diameter of 3.3 mm. Both ends of the shaped article were cut vertically to adjust the length of the shaped article to 1 m. With respect to the shaped article thus obtained, the spectral transmittances through an optical path length of 1 m were measured, and the average luminous transmittance at wavelengths of 400 to 700 nm was determined.

Apparatus: "V-670" manufactured by JASCO Corporation

Light sources: deuterium lamp (D2) and halogen lamp (WI)

Extrusion temperature: 185° C. (Example 1), 200° C. (Comparative Example 1)

(11) Color characteristics (Lightness and Chromaticity)

A resin composition containing an acrylic block copolymer (A) which was obtained in any of Examples described later was molded into a sheet-shaped article 5 cm in length, 5 cm in width and 3 mm in thickness using an injection molding machine ("SE18DU" manufactured by Sumitomo Heavy Industries, Ltd.) at a cylinder temperature of 220° C. and a mold temperature of 50° C. Color characteristics (lightness and chromaticity) were measured using the L*a*b* color system. The larger the value of L* (lightness) and the closer the values of a* and b* (chromaticity) to 0, the more suited the material as an optical component.

Apparatus: "SD5000" manufactured by NIPPON DENSHOKU INDUSTRIES CO., LTD.

Light source: D65

Field of view: 2°

(12) Chromaticity of Light Guide and Rate of Change in Chromaticity

A resin composition containing an acrylic block copolymer (A) which was obtained in any of Examples described later was extruded at 185° C. to give a round bar-shaped article having a diameter of 3.3 mm. Both ends of the shaped article were cut vertically to adjust the length of the shaped article to 1 m. A white LED light source was arranged at an end face of the shaped article, and light was guided through the article. At positions 10 cm and 90 cm away from the light source, the chromaticity coordinates x and y were measured. Further, the chromaticity coordinates x and y at 10 cm position were used as the references, and the rates of change in chromaticity at 90 cm position (in absolute values) were calculated using the formula described below, thereby obtaining an indicator of chromaticity change. The smaller the rates of change, the more suited the material as a light guide. The rates of change are preferably not more than 4%. From the point of view of the absolute values of chromaticity, it is preferable that the chromaticity coordinate x and the chromaticity coordinate y are in the range of 0.304 to 0.334 and in the range of 0.300 to 0.332, respectively, both at 10 cm position and 90 cm position from the light source.

Apparatus: "SR-3A" manufactured by TOPCON TECHNOHOUSE CORPORATION

Light source: white LED light source (luminous flux 135 lm, directional characteristics 120°)

Rate of chromaticity change (%)=|[(Chromaticity at 90 cm distance from light source)−(Chromaticity at 10 cm distance from light source)]÷(Chromaticity at 10 cm distance from light source)×100|

《Production Example 1》 [Synthesis of Acrylic Block Copolymer (A1)]

The inside of a 20 L reaction vessel was deaerated and was purged with nitrogen. Thereafter, at room temperature, there were added 10.29 kg of dried toluene, 0.019 kg of hexamethyltriethylenetetramine, and 0.35 kg of a toluene solution containing 0.17 mol of isobutyl bis(2,6-di-t-butyl-4-methylphenoxy)aluminum. Further, 0.077 mol of sec-butyllithium was added. To the mixture, 0.50 kg of methyl methacrylate was added, and the reaction was performed at room temperature for 1 hour. Subsequently, the inner temperature of the polymerization liquid was lowered to −25° C., and a mixture liquid containing 1.21 kg of n-butyl acrylate and 0.48 kg of benzyl acrylate was added dropwise over a period of 1 hour. Thereafter, 1.23 kg of methyl methacrylate was added, and the reaction liquid was brought back to room temperature and was stirred for 8 hours. Next, 0.30 kg of methanol was added to the reaction liquid to terminate the polymerization. After the termination of the polymerization, the reaction liquid was poured into a large excess of methanol, and the resultant precipitate was recovered. Consequently, an acrylic block copolymer (A1) was obtained which had a triblock structure composed of polymer block (a1-1)-polymer block (a2)-polymer block (a1-2). The (a1-1):(a2):(a1-2) mass ratio was 14.6:49.5:35.9. The evaluation results are described in Table 1.

《Production Example 2》 [Synthesis of Acrylic Block Copolymer (A2)]

An acrylic block copolymer (A2) which had a triblock structure composed of polymer block (a1-1)-polymer block (a2)-polymer block (a1-2) was obtained in the same manner as in Example 1, except that the amount of n-butyl acrylate in Example 1 was changed to 1.69 kg and benzyl acrylate was not added. The (a1-1):(a2):(a1-2) mass ratio was 14.6: 49.5:35.9. The evaluation results are described in Table 1.

TABLE 1

|  | Prod. Ex. 1 | Prod. Ex. 2 |
|---|---|---|
| Acrylic block copolymer (A) | A1 | A2 |
| Type of block copolymer | Triblock | Triblock |
| Polymer block (a1-1) component (mass %) | MMA 100/0 | MMA 100/0 |
| Polymer block (a2) component (mass %) | nBA/BzA 71.4/28.6 | nBA 100/0 |
| Polymer block (a1-2) component (mass %) | MMA 100/0 | MMA 100/0 |
| Weight average molecular weight (Mw) of block copolymer (A) | 62600 | 61300 |
| Molecular weight distribution (Mw/Mn) of block copolymer (A) | 1.11 | 1.14 |
| Content (mass %) of polymer block (a1) in block copolymer (A) | 50.5 | 50.5 |
| Refractive index of block copolymer (A) | 1.493 | 1.479 |
| Refractive index of polymer block (a1) | 1.492 | 1.492 |
| Refractive index of polymer block (a2) | 1.494 | 1.467 |
| Tensile elastic modulus (MPa) of block copolymer (A) | 612 | 950 |
| ODTT (° C.) of block copolymer (A) | 207 | 263 |

MMA: methyl methacrylate
nBA: n-butyl acrylate
BzA: benzyl acrylate

« Example 1 and Comparative Example 1 »

The acrylic block copolymers (A1) and (A2) obtained in Production Example 1 and Production Example 2 were tested to evaluate their performances as acrylic block copolymers and resin compositions. The evaluation results are described in Table 2 and Table 3.

« Examples 2 to 7 »

With use of a twin-screw extruder, the acrylic block copolymer (A1) obtained in Production Example 1 and methacrylic resin "PARAPET GF" (trade name, manufactured by KURARAY CO., LTD., weight average molecular weight 100,000) were melt-kneaded in proportions described in Table 2 below at a cylinder temperature of 200° C., and the kneaded product was extruded and cut to give pellets of a resin composition. The results of the evaluation of this resin composition are described in Table 2.

« Comparative Examples 2 and 3 »

With use of a twin-screw extruder, the acrylic block copolymer (A2) obtained in Production Example 2 and methacrylic resin "PARAPET GF" (trade name, manufactured by KURARAY CO., LTD., weight average molecular weight 100,000) were melt-kneaded in proportions described in Table 2 below at a cylinder temperature of 200° C., and the kneaded product was extruded and cut to give pellets of a resin composition. The results of the evaluation of this resin composition are described in Table 2.

TABLE 2

|  | Ex. 1 | Ex. 2 | Ex. 3 | Ex. 4 | Ex. 5 | Ex. 6 | Ex. 7 |
|---|---|---|---|---|---|---|---|
| Acrylic block copolymer (A) | | | | | | | |
| Acrylic block copolymer (A1) (parts by mass) | 100 | 98 | 95 | 92 | 70 | 50 | 20 |
| Acrylic block copolymer (A2) (parts by mass) | | | | | | | |
| Methacrylic resin | | | | | | | |
| PARAPET GF (parts by mass) | | 2 | 5 | 8 | 30 | 60 | 80 |
| Transparency | | | | | | | |
| Haze (%) | 0.4 | 0.4 | 0.4 | 0.5 | 0.4 | 0.5 | 0.8 |
| Total luminous transmittance (%) | 92.7 | 92.7 | 92.8 | 92.8 | 92.5 | 92.3 | 91.9 |
| Profile extrusion properties | | | | | | | |
| Discharge rate ratio | 39 | 39 | 37 | 39 | 40 | 39 | 52 |
| Surface smoothness | ○ | ○ | ○ | ○ | Δ | Δ | Δ |
| Heat resistance | | | | | | | |
| Deflection temperature under load (° C.) | 78 | — | — | 85 | 91 | 92 | 93 |

|  | Comp. Ex. 1 | Comp. Ex. 2 | Comp. Ex. 3 |
|---|---|---|---|
| Acrylic block copolymer (A) | | | |
| Acrylic block copolymer (A1) (parts by mass) | | | |
| Acrylic block copolymer (A2) (parts by mass) | 100 | 92 | 70 |
| Methacrylic resin | | | |
| PARAPET GF (parts by mass) | | 8 | 30 |
| Transparency | | | |
| Haze (%) | 0.5 | 0.6 | 0.7 |
| Total luminous transmittance (%) | 93.0 | 92.9 | 92.2 |
| Profile extrusion properties | | | |
| Discharge rate ratio | 61 | 46 | 49 |
| Surface smoothness | x | x | x |

TABLE 3

|  | Ex. 1 | Comp. Ex. 1 |
|---|---|---|
| Acrylic block copolymer (A) | | |
| Acrylic block copolymer (A1) (parts by mass) | 100 | |
| Acrylic block copolymer (A2) (parts by mass) | | 100 |
| Light guiding properties | | |
| Average luminous transmittance (%) at 400-700 nm wavelengths through 1 m optical path length | 23 | 17 |

From the results described in Table 2 and Table 3, it has been shown that the acrylic block copolymer (A1) having a refractive index of 1.485 to 1.495 and an order-disorder transition temperature (ODTT) of not more than 260° C. is excellent in all of transparency, profile extrusion properties, surface smoothness of shaped articles, and light guiding properties (Example 1). Further, it has been shown that the resin compositions containing the acrylic block copolymer (A1) are excellent in transparency, profile extrusion properties, and surface smoothness of shaped articles, and the resin compositions containing the acrylic block copolymer (A1) in a proportion higher than 90 mass % attain superior surface smoothness (Examples 2 to 4). The results also show that the resin compositions containing the acrylic block copolymer (A1) have a high deflection temperature under load as compared to the acrylic block copolymer (A1) alone, and are thus excellent also in heat resistance.

In contrast, the resin compositions that contain the acrylic block copolymer (A2) having a refractive index and an order-disorder transition temperature (ODTT) which fall outside the above ranges are poor in profile extrusion properties and light guiding properties, and exhibit markedly deteriorated surface smoothness (Comparative Examples 1 to 3).

« Examples 8 to 12 »

With use of a twin-screw extruder, the acrylic block copolymer (A1) obtained in Production Example 1 and phosphite-based compound (i) "ADK STAB PEP36/36A" (tradename, manufactured by ADEKA CORPORATION) were melt-kneaded in proportions described in Table 4 below at a cylinder temperature of 200° C., and the kneaded product was extruded and cut to give pellets of a resin composition. The results of the evaluation of this resin composition are described in Table 4.

« Examples 13 to 16 »

With use of a twin-screw extruder, the acrylic block copolymer (A1) obtained in Production Example 1, phosphite-based compound (i) "ADK STAB PEP36/36A", phenol-based compound (ii) "ADK STAB AO60", and phenol-based compound (iii) "ADK STAB AO20" (trade names, manufactured by ADEKA CORPORATION) were melt-kneaded in proportions described in Table 4 below at a cylinder temperature of 200° C., and the kneaded product was extruded and cut to give pellets of a resin composition. The results of the evaluation of this resin composition are described in Table 4.

TABLE 4

|  | Ex. 1 | Ex. 8 | Ex. 9 | Ex. 10 | Ex. 11 | Ex. 12 |
|---|---|---|---|---|---|---|
| Acrylic block copolymer (A) | | | | | | |
| Acrylic block copolymer (A1) (parts by mass) | 100 | 100 | 100 | 100 | 100 | 100 |
| Antioxidants | | | | | | |
| Phosphite-based compound (i) (parts by mass) | | 0.02 | 0.05 | 0.1 | 0.2 | 0.3 |
| Phenol-based compound (ii) (parts by mass) | | | | | | |
| Phenol-based compound (iii) (parts by mass) | | | | | | |
| Color characteristics (lightness and chromaticity) | | | | | | |
| L* | 97.1 | 97.1 | 97.1 | 97.1 | 97.1 | 97.1 |
| a* | −0.2 | −0.2 | −0.1 | −0.1 | −0.1 | −0.1 |
| b* | 0.5 | 0.3 | 0.2 | 0.3 | 0.3 | 0.3 |

|  | Ex. 13 | Ex. 14 | Ex. 15 | Ex. 16 |
|---|---|---|---|---|
| Acrylic block copolymer (A) | | | | |
| Acrylic block copolymer (A1) (parts by mass) | 100 | 100 | 100 | 100 |
| Antioxidants | | | | |
| Phosphite-based compound (i) (parts by mass) | 0.1 | 0.1 | 0.1 | 0.1 |
| Phenol-based compound (ii) (parts by mass) | 0.02 | 0.05 | 0.1 | |
| Phenol-based compound (iii) (parts by mass) | | | | 0.02 |
| Color characteristics (lightness and chromaticity) | | | | |
| L* | 97.1 | 97.1 | 97.1 | 97.1 |
| a* | −0.1 | −0.2 | −0.2 | −0.1 |
| b* | 0.4 | 0.4 | 0.4 | 0.4 |

From the results described in Table 4, it has been shown that the resin compositions containing the acrylic block copolymer (A) of the invention, and the phosphite-based compound (i) and/or the phenol-based compound (ii) attain improved chromaticity for use as optical components (Examples 8 to 16). In particular, the resin compositions containing the phosphite-based compound (i) alone as the antioxidant have been shown to have values of a* and b* that are close to 0 and hence to have still enhanced chromaticity for use as optical components (Examples 8 to 12).

« Examples 17 to 21 »

With use of a twin-screw extruder, the acrylic block copolymer (A1) obtained in Production Example 1, phosphite-based compound (i) "ADK STAB PEP36/36A" (tradename, manufactured by ADEKA CORPORATION), blue pigment "3PA-5500A" (trade name, manufactured by Nippon Pigment Company Limited) and purple pigment "TV-4M" (trade name, manufactured by Nippon Pigment Company Limited) were melt-kneaded in proportions described in Table 5 below at a cylinder temperature of 20° C., and the kneaded product was extruded and cut to give pellets of a resin composition. The results of the evaluation of this resin composition are described in Table 5.

TABLE 5

|  | Ex. 10 | Ex. 17 | Ex. 18 | Ex. 19 | Ex. 20 | Ex. 21 |
|---|---|---|---|---|---|---|
| Acrylic block copolymer (A) | | | | | | |
| Acrylic block copolymer (A1) (parts by mass) | 100 | 100 | 100 | 100 | 100 | 100 |
| Antioxidant | | | | | | |
| Phosphite-based compound (i) (parts by mass) | 0.1 | 0.1 | 0.1 | 0.1 | 0.1 | 0.1 |
| Colorants | | | | | | |
| Blue colorant (ppm) | | 1 | 1 | 2 | 5 | 10 |
| Purple colorant (ppm) | | 1 | 5 | | | |
| Chromaticity of light guide (at 10 cm distance from light source) | | | | | | |
| x | 0.329 | 0.314 | 0.317 | 0.320 | 0.314 | 0.301 |
| y | 0.329 | 0.315 | 0.318 | 0.315 | 0.309 | 0.297 |
| Chromaticity of light guide (at 90 cm distance from light source) | | | | | | |
| x | 0.370 | 0.320 | 0.327 | 0.308 | 0.265 | 0.201 |
| y | 0.375 | 0.327 | 0.314 | 0.319 | 0.270 | 0.190 |
| Rate (%) of change in chromaticity of light guide [absolute value] | | | | | | |
| x | 12 | 2 | 3 | 4 | 16 | 33 |
| y | 14 | 4 | 1 | 1 | 13 | 36 |

From the results described in Table 5, it has been shown that the resin compositions containing the acrylic block copolymer (A) of the invention and the colorant satisfy preferred ranges of chromaticity coordinates x and y and have a small rate of chromaticity change when light is guided therethrough, and are thus more suited as light guides (Examples 17 to 21). In particular, the resin compositions containing the acrylic block copolymer (A), the blue colorant, the purple colorant and the phosphite-based compound (i) have been shown to have a smaller rate of chromaticity change when light is guided therethrough and thus to be more suited as light guides (Examples 17 and 18).

The invention claimed is:

1. A resin composition, comprising
an acrylic block copolymer that comprises a polymer block (a1) comprising methacrylic acid ester units and a polymer block (a2) comprising acrylic acid ester units, the acrylic block copolymer having a refractive index of 1.485 to 1.495 and an order-disorder transition temperature (ODTT) of not more than 260° C.;

a phosphite-based compound represented by formula (i) in a proportion of 0.01 to 1 part by mass relative to 100 parts by mass of the acrylic block copolymer:

wherein in the formula (i), $R^1$ is a substituted or unsubstituted aromatic group, $R^2$ and $R^3$ are each independently a hydrogen atom or an organic group, $R^1$ and $R^2$ or $R^3$ optionally bond to each other to form a ring in combination with the phosphorus atom and the oxygen atom constituting the phosphite, and $R^2$ and $R^3$ optionally bond to each other to form a ring in combination with the phosphorus atom and the oxygen atom constituting the phosphite; and a blue colorant having a maximum absorption wavelength ranging from 590 to 610 nm in a proportion of 0.1 to 4 ppm relative to the acrylic block copolymer.

2. The resin composition according to claim 1, comprising the acrylic block copolymer in a proportion of more than 90 mass %.

3. The resin composition according to claim 1, further comprising a purple colorant having a maximum absorption wavelength ranging from 510 to 530 nm in a proportion of 0.1 to 10 ppm relative to the acrylic block copolymer.

4. A shaped article, comprising the resin composition according to claim 1.

5. An optical component, comprising the shaped article according to claim 4.

6. A light guide, comprising the optical component according to claim 5.

* * * * *